US011063858B2

(12) United States Patent
Gray (10) Patent No.: US 11,063,858 B2
(45) Date of Patent: Jul. 13, 2021

(54) SYSTEMS AND METHODS FOR TESTING A ROUTER DEVICE

(71) Applicant: Charter Communications Operating, LLC, St. Louis, MO (US)

(72) Inventor: Willard Andrew Gray, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 48 days.

(21) Appl. No.: 16/698,710

(22) Filed: Nov. 27, 2019

(65) Prior Publication Data

US 2021/0160163 A1    May 27, 2021

(51) Int. Cl.
*H04L 12/26* (2006.01)
*H04L 12/935* (2013.01)
*H04L 29/06* (2006.01)

(52) U.S. Cl.
CPC .......... *H04L 43/50* (2013.01); *H04L 43/065* (2013.01); *H04L 43/10* (2013.01); *H04L 49/3009* (2013.01); *H04L 69/08* (2013.01); *H04L 69/22* (2013.01)

(58) Field of Classification Search
CPC ....... H04L 43/50; H04L 43/065; H04L 43/10; H04L 49/3009; H04L 69/08; H04L 69/22
See application file for complete search history.

(56) References Cited

U.S. PATENT DOCUMENTS

| 6,728,214 | B1* | 4/2004 | Hao | H04L 43/50 370/241 |
|---|---|---|---|---|
| 9,696,859 | B1 | 7/2017 | Heller et al. | |
| 9,729,414 | B1 | 8/2017 | Oliveira et al. | |
| 2001/0013105 | A1* | 8/2001 | Kang | H04L 43/50 714/43 |
| 2005/0135363 | A1 | 6/2005 | Horinouchi et al. | |
| 2005/0286439 | A1* | 12/2005 | Capelle | H04L 45/00 370/252 |
| 2006/0140128 | A1* | 6/2006 | Chi | H04L 43/50 370/241 |

* cited by examiner

*Primary Examiner* — Ricky Q Ngo
*Assistant Examiner* — Stephen N Steiner
(74) *Attorney, Agent, or Firm* — The Marbury Law Group, PLLC (57) ABSTRACT

Various embodiments include computing devices and methods for testing a router device. A processor of the computing device may receive one or more Border Monitoring Protocol (BMP) messages collected from a production router. The processor may obtain header information from a header portion of the one or more BMP messages. The processor may modify an origination address in the header information to match an address of a first test network element. The processor may modify a next hop address in the header information to match an address of a second test network element. The processor may convert the one or more BMP messages including the modified header information to one or more Border Gateway Protocol (BGP) messages. The processor may send the one or more BGP messages to a router under test in the test network.

24 Claims, 7 Drawing Sheets

| Type Code | Meaning |
|---|---|
| 0 | Route Monitoring |
| 1 | Statistics Report |
| 2 | Peer Down Notification |
| 3 | Peer Up Notification |
| 4 | Initiation Message |
| 5 | Termination Message |
| 6 | Route Mirroring Message |

SYSTEMS AND METHODS FOR TESTING A ROUTER DEVICE

BACKGROUND

Border Gateway Protocol (BGP) is a network routing protocol and is commonly used between Internet service providers. BGP enables systems to exchange information about the networks that each system can reach including path information for Autonomous Systems (AS). BGP also enables systems to make routing decisions based on network policies, paths, or rule sets. Proper configuration of network devices such as routers requires that new policies are tested.

SUMMARY

Various aspects include methods that may be implemented on a processor of a computing device for testing a router device. In various embodiments, the processor of the computing device may perform operations including receiving one or more Border Monitoring Protocol (BMP) messages collected from a production router, obtaining header information from a header portion of the one or more BMP messages, modifying an origination address in the header information to match an address of a first test network element, modifying a next hop address in the header information to match an address of a second test network element, converting the one or more BMP messages including the modified header information to one or more Border Gateway Protocol (BGP) messages, and sending the one or more BGP messages to a router under test in the test network.

Some embodiments may include recording a response from the router under test based on the sent one or more BGP messages. In some embodiments, the received one or more BMP messages may be unprocessed by the production router. Some embodiments may include modifying autonomous system (AS) path information in the header information to match an AS path in the test network. Some embodiments may include generating a data structure that may include the one or more received BMP messages, the obtained header information, the modified origination address, and the modified next hop address. In such embodiments, sending the one or more BGP messages to a router under test in the test network may include sending the data structure to the router under test.

Some embodiments may include recording a timestamp of receipt of the one or more BMP messages, wherein sending the one or more BGP messages to a router under test in the test network may include sending the one or more BGP messages to the router under test according to the respective recorded timestamps. In such embodiments, sending the one or more BGP messages to the router under test according to the respective recorded timestamps may include sending the one or more BGP messages using a relative timing of the recorded timestamps.

Some embodiments may include storing the one or more BMP messages collected from the production router in a recorder element. In such embodiments, obtaining header information from a header portion of the one or more BMP messages may include retrieving the stored one or more BMP message from the recorder element.

Various aspects further include a computing device having a processor configured with processor executable instructions to perform operations of any of the methods summarized above. Various aspects further include a processing device for use in a computing device and configured to perform operations of any of the methods summarized above. Various aspects include a computing device having means for performing functions of any of the methods summarized above. Various aspects include a non-transitory processor-readable storage medium having stored thereon processor-executable instructions configured to cause a processor of a computing device to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

The term "computing device" is used herein to refer to any one or all of, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, cordless phones, network-connected displays (such as advertisement screens, news screens, and the like), wireless local loop (WLL) station, entertainment devices (for example, a music or video device, or a satellite radio), gaming devices, wireless gaming controllers, cameras, medical devices or equipment, biometric sensors/devices, wearable devices (such as smart watches, smart clothing, smart glasses, smart wrist bands, smart jewelry (for example, smart ring, smart bracelet), smart meters/sensors, industrial manufacturing equipment, router devices, appliances, global positioning system devices, wireless-network enabled Internet of Things (IoT) devices including large and small machinery and appliances for home or enterprise use, wireless communication elements within autonomous and semiautonomous vehicles, a vehicular component or sensor, wireless devices affixed to or incorporated into various mobile platforms, and similar electronic devices that include a memory, wireless communication components and a programmable processor, or that is configured to communicate via a wireless or wired medium. A wireless device also may be referred to as an access terminal, a terminal, a mobile station, a mobile device, a wireless communication device, a handheld device, a subscriber unit, a station, etc.

Border Gateway Protocol (BGP) is a network routing protocol commonly used between Internet service providers that enables systems to exchange information about the networks that each system can reach including path information for Autonomous Systems (AS). BGP also enables systems to make routing decisions based on network policies, paths, or rule sets.

A router configured to enable BGP may receive routing updates (e.g., Network Layer Reachability Information (NLRI) UPDATEs) from other network elements (e.g., peer devices or neighbor devices), process the routing updates for local use, and advertise selected routes to the same or different network elements based on network policies. A BGP router may maintain its own master routing table, called the Local Routing Information Base (Loc-RIB), separate from a main routing table of the BGP router. The Loc-RIB is typically used for BGP processes, and should not be confused with the router's main routing table that the router uses for packet forwarding.

For each neighbor device, the BGP router may maintain a conceptual Adjacent Routing Information Base, Incoming (Adj-RIB-In) containing the routing updates received from a neighbor device, and a conceptual Adjacent Routing Information Base, Outgoing (Adj-RIB-Out) for routing updates to be sent to the neighbor. The local routing information base stores the resulted information from processing the RIBs-In database's information. These are the routes that are used locally after applying BGP policies and decision process. The Adj-RIB-In may include unedited routing information sent by neighboring routers. This is information received from peers before applying any attribute modifications or route filtering. The Local RIB may include routing information the router uses, developed from Adj-RIBs-In. The Adj-RIB-out may include information the router may to send to neighboring routers. For example, the Adj-RIB-out may include routing information selected by the local BGP router to advertise to its peers through BGP update messages.

Proper configuration of network devices such as routers requires that new policies, and the router's capabilities, are thoroughly tested. Conventional testing methodologies involve using a route reflector to redirect BGP information to a router being tested, but route reflectors only capture BGP information post-processing by the source router, and such processed information is not useful for testing new policies that, for example, may be configured to perform route filtering on unprocessed information.

Various embodiments include methods and computing device configured to perform methods for testing a router device in a test network. In various embodiments, the computing device may collect from a production router unprocessed or pre-processed BGP data, modify one or more header elements of the preprocessed BGP data to reflect one or more network elements in a test network, and send the modified preprocessed BGP data to a router under test to simulate a BGP session from the production router.

In some embodiments, the computing device may collect BGP data, such as Adj-RIB-In BGP data, processes the collected BGP data, and replay the processed BGP data to a router under test to simulate a BGP session from the router that originally sent the BGP data. In some embodiments, the computing device may employ a monitoring protocol, such as Open BGP Monitoring Protocol (OpenBMP), to collect the BGP data.

In various embodiments, the computing device may receive one or more BGP messages collected from a production router. In some embodiments, the computing device may receive the one or more BGP messages in one or more BMP messages. In some embodiments, the production router may be outside of the test network (e.g., on an outside communication network such as the Internet). In some embodiments, the production router may be configured to transmit the one or more BMP messages, which may be collected by a collection router that is configured to receive one or more BMP messages. For example, the production router and the collection router may be configured with an OpenBMP element or module to communicate the one or more BMP messages. In some embodiments, the received BGP messages are unprocessed (e.g., unfiltered) by the production router. In some embodiments, the computing device may be configured with a conversion layer element, module, or function that may be configured to receive and process BMP messages, as further described below.

In some embodiments, the computing device may obtain header information from a header portion of the one or more BMP messages. For example, a BMP message may include a header portion that includes message type information, which indicates a type of data that may be contained in a payload portion of the BMP message. The header portion of the BMP message may also include a peer Internet Protocol (IP) address and a peer AS number. In some embodiments, the header portion of the BMP message may also include AS path information. In some embodiments, the computing device may modify an origination address in the header information to match an address of a first test network element. In some embodiments, the computing device may modify a next hop address in the header information to match an address of the second test network element. In some embodiments, the computing device may modify AS path information to match an AS path in the test network. In some embodiments, the conversion layer of the computing device may perform one or more such modifications.

In some embodiments, the computing device may generate a data structure that includes the one or more collected BMP messages, the obtained header information, the modified origination address, and the modified next hop address. In some embodiments, the data structure may also include the modified AS path information. In some embodiments, the computing device may send the generated data structure to the router under test. In some embodiments, sending the generated data structure including the various modified information may test the capability of a policy, such as a filtering policy, of the router under test to process or handle the various information in the data structure. In some embodiments, the conversion layer may generate a table using information from the one or more BMP messages including routes sent from each peer device. In some embodiments, the received BMP messages may include multiple BMP sessions multiplexed into a stream of BMP messages. In such embodiments, the processor may generate a different data structure for each of a plurality of originating production routers (i.e., a first data structure corresponding to a first production router, a second data structure corresponding to a second production router, etc.). In such embodiments, the computing device may use header information, such as per-peer field information, to identify each data structure and to associate information in BMP messages with each data structure.

In some embodiments, the computing device may convert the one or more BMP messages including the modified header information to one or more BGP messages. In some embodiments, the computing device may send the one or more BGP messages to a router under test in the test network. In some embodiments, the computing device may record a response from the router under test based on the BMP messages sent to the router under test. In some embodiments, the computing device may send a query message to the router under test requesting routes that the router under test has accepted and/or rejected. In some embodiments, the computing device may send a query message to the router under test requesting any modifications that the router under test has applied to any routes. In some embodiments, the response may include an indication of the functioning of a routing policy or other configuration of the router under test. In some embodiments, the response may include an indication of the accuracy and/or speed with which the router under test processes or handles the sent BMP messages. In some embodiments, the response may include another suitable indication of the functioning of the router under test.

In some embodiments, the computing device may record a timestamp of a time at which each BMP message was received by the computing device. In some embodiments, the computing device may use one or more recorded timestamps to send the one or more BMP messages to the router under test. For example, the computing device may send the one or more BMP messages to the router under test based on the relative timing or time intervals of the one or more recorded timestamps to simulate or reflect the flow of BMP messages from the production router.

Figure 1:
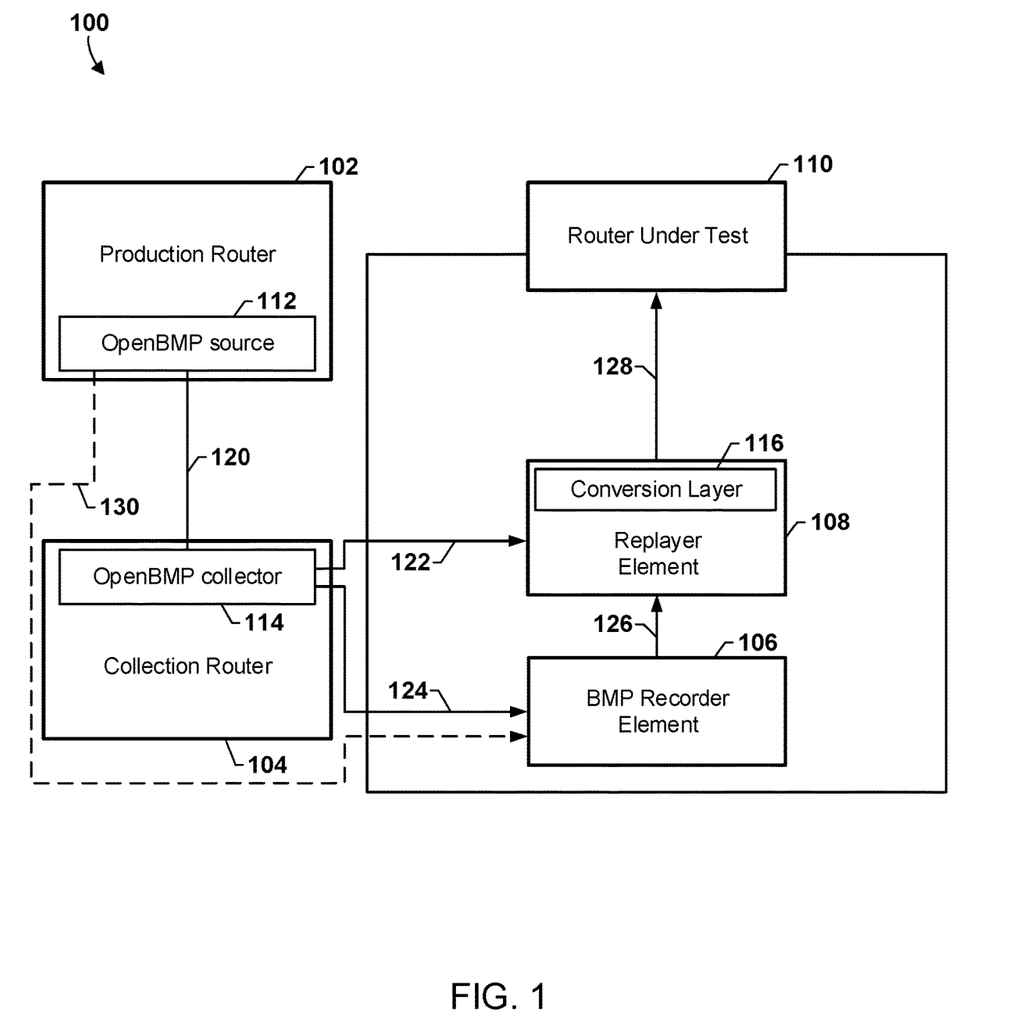
FIG. 1 is a system block diagram of a communication system according to various embodiments.

Various embodiments may be implemented within a variety of communication systems 100, an example of which is illustrated in FIG. 1. With reference to FIG. 1, the communication system 100 may include a production router 102, a collection router 104, a BMP recorder element 106, a replayer element 108, and a router under test 110. The production router 102 may include a network element such as a router device on a network, such as the Internet that is configured to send BMP messages. The collection router 104 may include a router device configured to receive BMP messages from the production router 102 via a communication link 120. The production router 102 may include hardware, software, or any combination of hardware and software, that enables the production router 102 send the BMP messages, such as an OpenBMP source 112. The collection router 104 may include hardware, software, or any combination of hardware and software, that enables the production router 102 to send the BMP messages, such as an OpenBMP collector 114. In some embodiments, the OpenBMP collector 114 may include an Apache Kafka module configured to receive the BMP messages. In some embodiments, the OpenBMP source 112 and the OpenBMP collector 114 may establish an BMP session via the communication link 120

The BMP recorder element 106 may be configured to receive BMP messages from the collection router 104 via a communication link 124. The BMP recorder element 106 be configured to store received BMP messages in memory. The BMP recorder element 106 may be further configured to send or forward one or more recorded BMP messages to the replayer element 108 via a communication link 126. Additionally or alternatively, the BMP recorder element 106 may be configured to receive BMP messages from the production router 102/the OpenBMP source 112 via a direct transport link 130. In some embodiments, the BMP recorder element 106 may be configured to record the BMP messages for re-use, for example, to send a stream of BMP messages to the router under test, or to send a stream of BMP messages multiple times after making changes and/or to the BMP messages, and the like.

The replayer element 108 may also be configured to receive BMP messages sent by the production router 102, received by the collection router 104, and forwarded or sent on from the collection router 104 to the replayer element 108 via a communication link 122. The replayer element 108 may be configured to modify one or more aspects of received BMP messages, such as one or more elements of header information in a BMP message. In some embodiments, the replayer element 108 may be configured to receive BMP messages that are unprocessed by the production router 102 and modify one or more aspects of the received unprocessed BMP messages. The replayer element 108 may include a conversion layer 116 that may be configured to enable the replayer element 108 to convert modified BMP messages to BGP messages for use with the router under test 110. The replayer element 108 may be configured to send one or more modified BMP messages to the router under test 110 via a communication link 128. In some embodiments, the replayer element 108 may be configured to send the one or more modified BMP messages based on "live" data (i.e., BMP message that have been recently received) to the router under test 110. In some embodiments, the replayer element 108 may be configured to send the one or more modified BMP messages based on BMP messages saved in and later retrieved from the BMP recorder element 106.

The router under test 110 may be a network element similar to the production router 102 and the collection router 104. The router under test 110 may receive modified BMP messages from the replayer element 108. In some embodiments, the router under test 110 may provide one or more responses based on the received modified BMP messages. The responses provided by the router under test 110 may be monitored and/or analyzed to determine aspects of the behavior of the router under test 110, such as whether a routing policy provided to the router under test functions appropriately, or another suitable test of the behavior of the router under test 110.

The communication links 120, 122, 124, 126, and 128 may include wired and/or wireless communication links. The communication links 120-128 may include a plurality of carrier signals, frequencies, or frequency bands, each of which may include a plurality of logical channels. The communication links 120-128 may employ one or more communication protocols. Examples of wired communication protocols may include Ethernet, Point-To-Point protocol, High-Level Data Link Control (HDLC), Advanced Data Communication Control Protocol (ADCCP), and Transmission Control Protocol/Internet Protocol (TCP/IP), or another suitable wired communication protocol, including further implementations of any of the foregoing, which may be employed on a variety of wired networks (e.g., Ethernet, TV cable, telephony, fiber optic and other forms of physical network connections). The communication links 120-128 may include wireless communication links that may utilize one or more radio access technologies (RATs). Examples of RATs that may be used in one or more of the various wireless communication links 120-128 include an Institute of Electrical and Electronics Engineers (IEEE) 802.15.4 protocol (such as Thread, ZigBee, and Z-Wave), any of the Institute of Electrical and Electronics Engineers (IEEE) 16.11 standards, or any of the IEEE 802.11 standards, the Bluetooth® standard, Bluetooth Low Energy (BLE), 6LoWPAN, LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTE-fire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), and Weightless. Further examples of RATs that may be used in one or more of the various wireless communication links within the communication system 100 include 3GPP Long Term Evolution (LTE), 3G, 4G, 5G, Global System for Mobility (GSM), GSM/General Packet Radio Service (GPRS), Enhanced Data GSM Environment (EDGE), Code Division Multiple Access (CDMA), frequency division multiple access (FDMA), time division multiple access (TDMA), Wideband Code Division Multiple Access (W-CDMA), Worldwide Interoperability for Microwave Access (WiMAX), Time Division Multiple Access (TDMA), and other mobile telephony communication technologies cellular RATs, Terrestrial Trunked Radio (TETRA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, and other mobile telephony communication technologies cellular RATs or other signals that are used to communicate within a wireless, cellular or Internet of Things (IoT) network or further implementations thereof.

Figure 2:
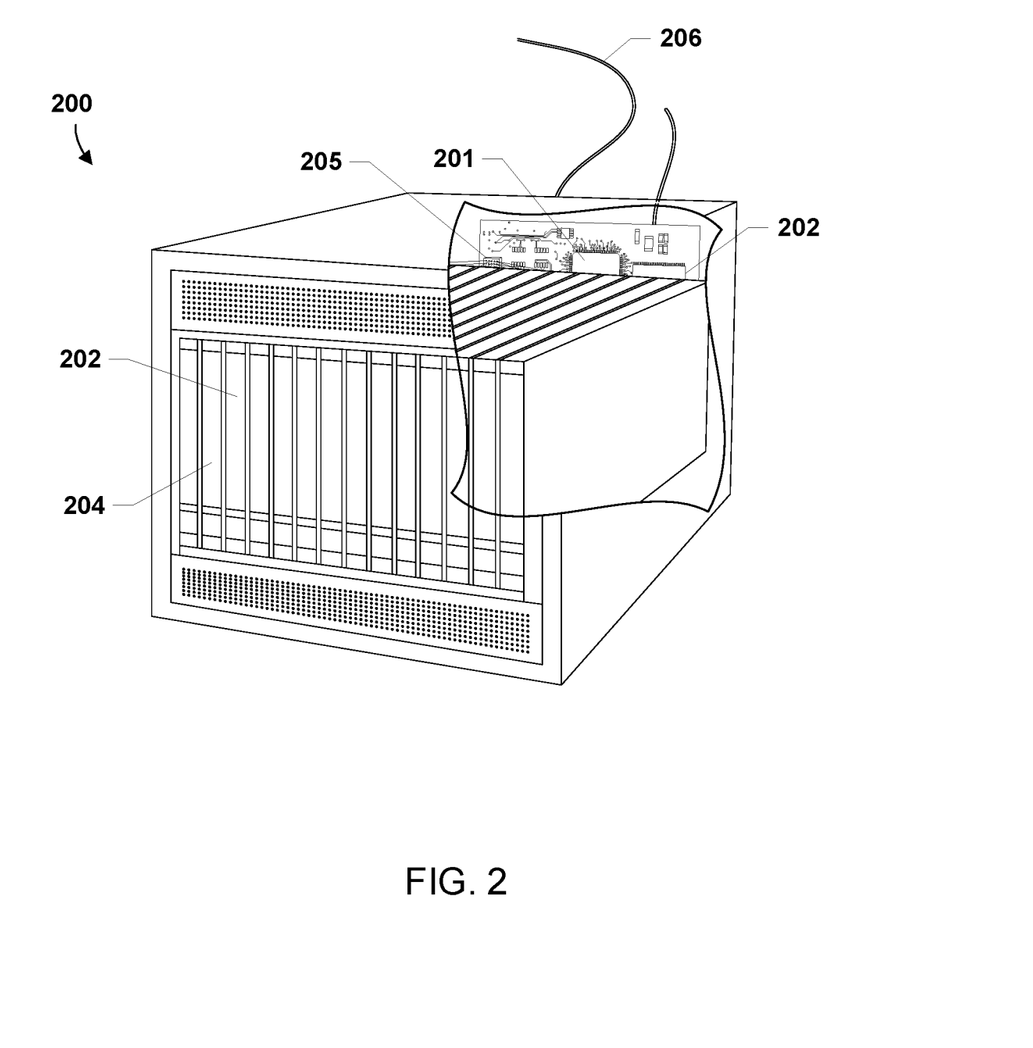
FIG. 2 is a component block diagram illustrating components of a network element suitable for implementing various embodiments.

Various embodiments may employ a computing device as a network element of a communication network. Such network elements may typically include at least the components illustrated in FIG. 2, which illustrates an example network element 200 that may include aspects of, for example, the production router 102, the collection router 104, the BMP recorder element 106, the replayer element 108, and the router under test 110. With reference to FIGS. 1 and 2, the network element 200 may include a processor 201 coupled to volatile memory 202 and a large capacity nonvolatile memory, such as a disk drive 203. The network element 200 may also include a peripheral memory access device such as a floppy disc drive, compact disc (CD) or digital video disc (DVD) drive 206 coupled to the processor 201. The network element 200 may also include network access ports 204 (or interfaces) coupled to the processor 201 for establishing data connections with a network, such as the Internet and/or a local area network coupled to other system computers and servers. Similarly, the network element 200 may include additional access ports, such as USB, Firewire, Thunderbolt, and the like for coupling to peripherals, external memory, or other devices.

The processor 201 may be any programmable microprocessor, microcomputer or multiple processor chip or chips that can be configured by software instructions (applications) to perform a variety of functions, including the functions of various embodiments described below. Software applications may be stored in the non-volatile memory 203 and/or the volatile memory 202 before they are accessed and loaded into the processor 201. The processor 201 may include internal memory sufficient to store the application software instructions.

Figure 3:
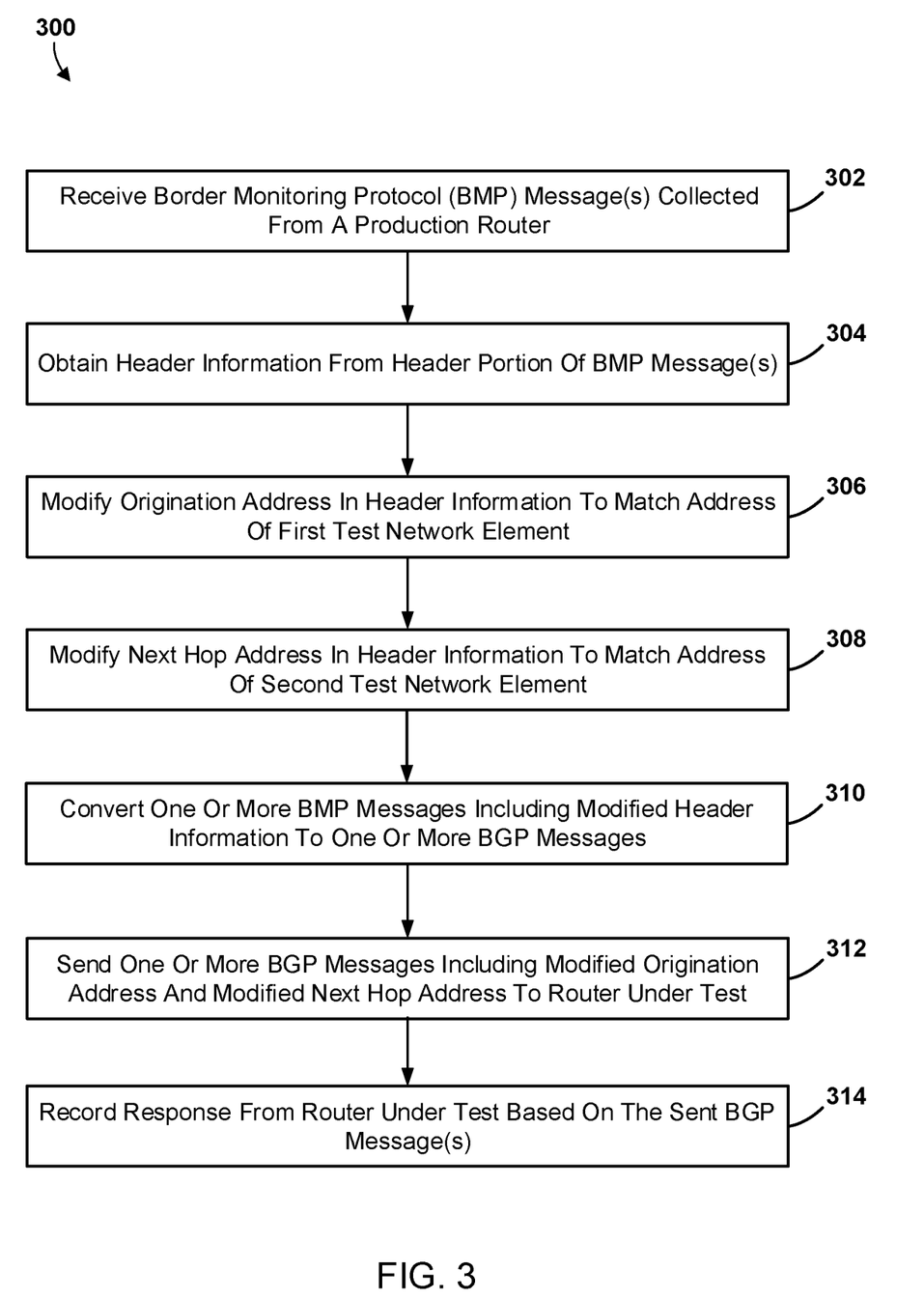
FIG. 3 is a process flow diagram illustrating a method of testing a router device according to various embodiments.
Figure 4:
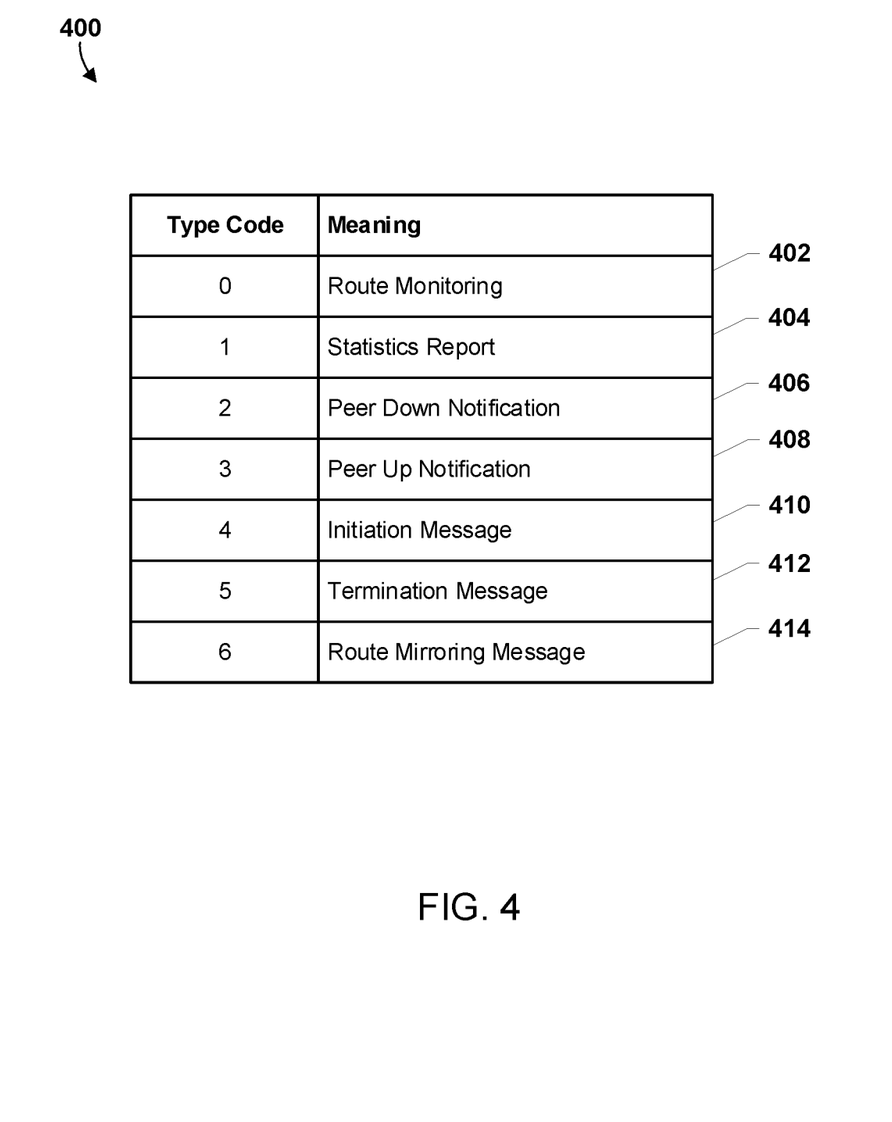
FIG. 4 illustrates header information of a Border Monitoring Protocol message according to various embodiments.

FIG. 3 is a process flow diagram illustrating a method of testing a router device, and FIG. 4 illustrates header information of a Border Monitoring Protocol message, according to various embodiments. With reference to FIGS. 1-4, the operations of the method 300 may be may be implemented in hardware components and/or software components of a computing device (e.g., the network element 200) the operation of which may be controlled by one or more processors (e.g., the processor 201 or the like).

In block 302, the processor may receive one or more Border Monitoring Protocol (BMP) messages collected from a production router. For example, the processor may receive one or more BMP messages that are sent by a production router (e.g., the production router 102). In some embodiments, the one or more BMP messages may be received by a collection router (e.g., the collection router 104). In some embodiments, a processor of a replayer element (e.g., the replayer element 108) may receive the one or more collected BMP messages from the collection router. In some embodiments, the processor may receive the one or more BMP messages from a recorder element (e.g., the BMP recorder element 106) where previously-received BMP message have been stored.

In block 304, the processor may obtain header information from a header portion of the one or more BMP messages. For example, each BMP message may include a header portion that may carry a variety of information. For example, with reference to FIG. 4, the header portion may include message type codes that indicate a type of data that may be contained in a payload portion of the BMP message. In some embodiments, the header portion may include seven message type codes 402-414, indicating route monitoring, statistics report, peer down notification, peer up notification, initiation message, termination message, and route mirroring message, respectively.

Route monitoring messages may be used for initial synchronization of ADJ-RIBs-In, and also may be used for ongoing monitoring of an ADJ-RIB-In state. A route monitoring may be sent at the start of a BMP session and may include a copy of the BGP peer's Adj-RIB-In table (e.g., all prefixes received to date). A statistics reporting messages may indicate various BMP message characteristics or quantities thereof. Peer down notification and peer up notification messages may include information related to a status of a peer or neighbor computing device. Initiation messages may indicate the beginning of a BMP session, such as the beginning of a BMP message or BMP message stream. A termination message may indicate the closing of a BMP session. Route mirroring messages may be used for duplication of BMP messages has received. For example, a BMP message may be copied or duplicated for monitoring, in some cases without state compression. In some embodiments, route mirroring may be performed after initial synchronization (e.g., between a BMP source such as the OpenBMP source 112, and a BMP collector, such as the OpenBMP collector 114). In some embodiments, mirrored BMP messages may provide updates to be included in a data structure corresponding to the originating production router.

In some embodiments, the header portion of the BMP message may also include a peer Internet Protocol (IP) address and a peer AS number. In some embodiments, the header portion of the BMP message may also include the header portion of the BMP message may also include a peer Internet Protocol (IP) address and a peer AS number.

In block 306, the processor may modify an origination address in the header information to match an address of a first test network element.

In block 308, the processor may modify a next hop address in the header information to match an address of the second test network element.

In block 310, the processor may convert the one or more BMP messages including the modified header information to one or more BGP messages.

In block 312, the processor may send one or more BGP messages including the modified origination address and the modified next hop address to a router under test in the test network.

In block 314, the processor may record a response from the router under test based on the sent one or more BGP messages. In some embodiments, the processor may record a response from the router under test based on the BGP messages sent to the router under test. In some embodiments, the processor may send a query message to the router under test requesting routes that the router under test has accepted and/or rejected. In some embodiments, the processor may send a query message to the router under test requesting any modifications that the router under test has applied to any routes.

Figure 5:
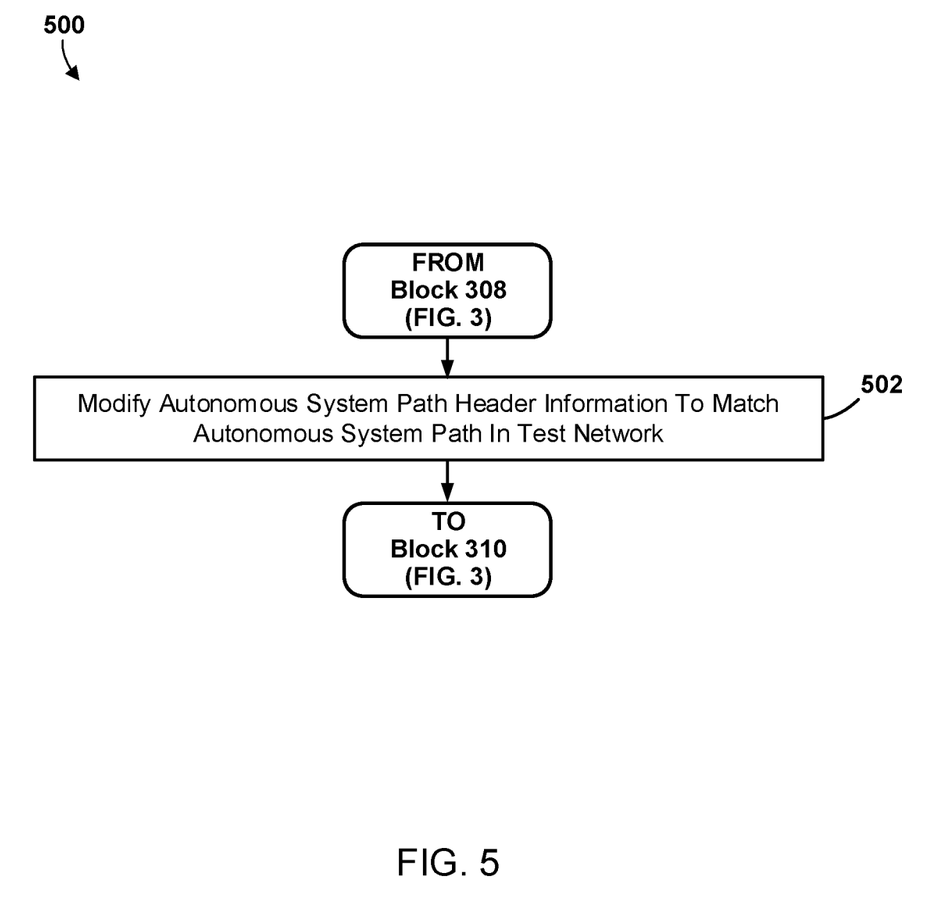
FIG. 5 is a process flow diagram illustrating operations that may be performed as part of a method of testing a router device according to various embodiments.

FIG. 5 is a process flow diagram illustrating operations 500 that may be performed as part of a method of updating a resource address according to various embodiments. With reference to FIGS. 1-5, the operations of the method 500 may be may be implemented in hardware components and/or software components of a computing device (e.g., the network element 200) the operation of which may be controlled by one or more processors (e.g., the processor 201 or the like).

Following the operations of block 308 (FIG. 3), the processor may modify autonomous system path information in the header information to match an autonomous system path in the test network in block 502.

The processor may proceed to perform the operations of block 310 (FIG. 3).

Figure 6:
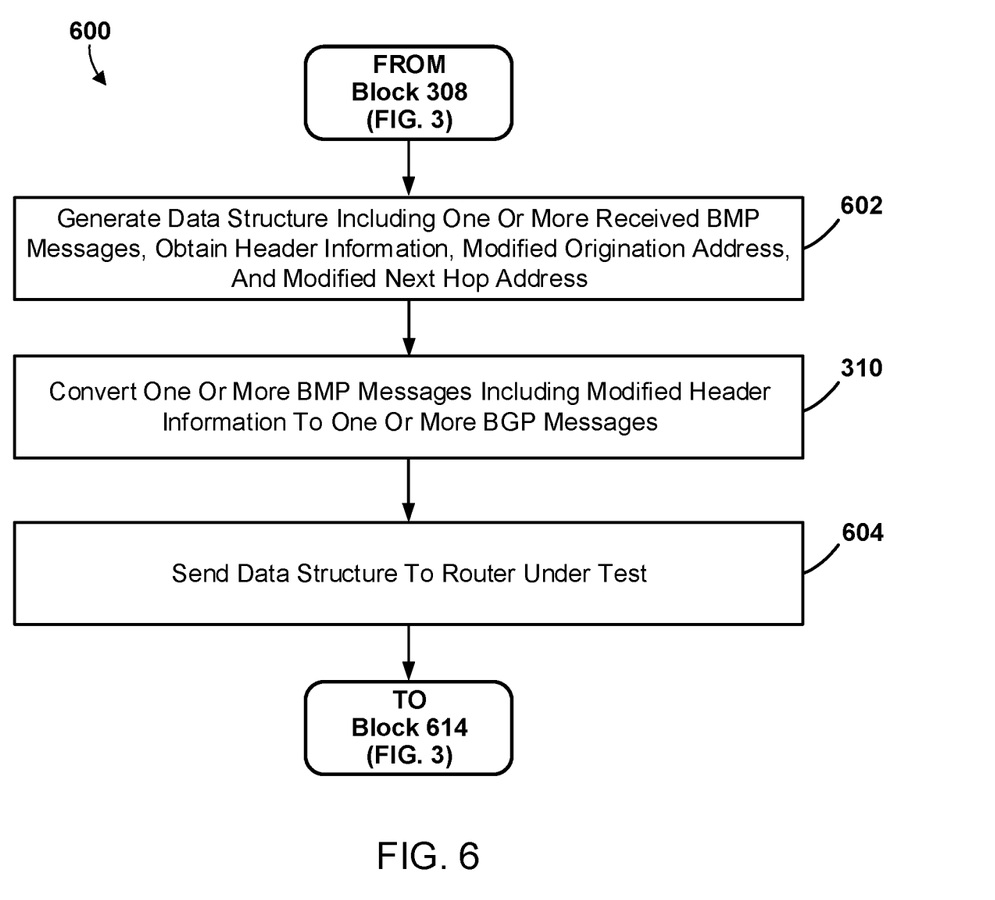
FIG. 6 is a process flow diagram illustrating operations that may be performed as part of a method of testing a router device according to various embodiments.

FIG. 6 is a process flow diagram illustrating operations 600 that may be performed as part of a method of updating a resource address according to various embodiments. With reference to FIGS. 1-6, the operations of the method 600 may be may be implemented in hardware components and/or software components of a computing device (e.g., the network element 200) the operation of which may be controlled by one or more processors (e.g., the processor 201 or the like). In block 310, the processor may perform operations of like-numbered block of the method 300 as described.

Following the operations of block 308 (FIG. 3), the processor may generate a data structure that includes one or more received BMP messages, obtain header information, the modified address, and the modified next hop address in block 602.

In some embodiments, information included in the BMP messages may be an update to previously received information. In some embodiments, and update message may specify a set of path attributes to be applied against a set of routes. In some embodiments, such update messages may follow a format such as BGP UPDATE message formatting rules. In some embodiments, the processor may update a data structure with such updated information. For example, the processor may add a route to the data structure (e.g., a route listed in Network Layer Reachability Information may be added to the table, with any included path attributes encoded in the UPDATE). In some embodiments, the path attributes include AS path and next hop address, and may include other data points (e.g., AS path and next hop information).

In block 604, the processor may send the data structure to the router under test. In some embodiments, sending the data structure to the router under test may serve to test a filter, policy, or other functionality of the router under test using a large group or amount of collected modified BMP messages. In some embodiments, the processor may convert the information in the data structure into a BGP format for sending to the router under test.

The processor may proceed to perform the operations of block 314 (FIG. 3).

Figure 7:
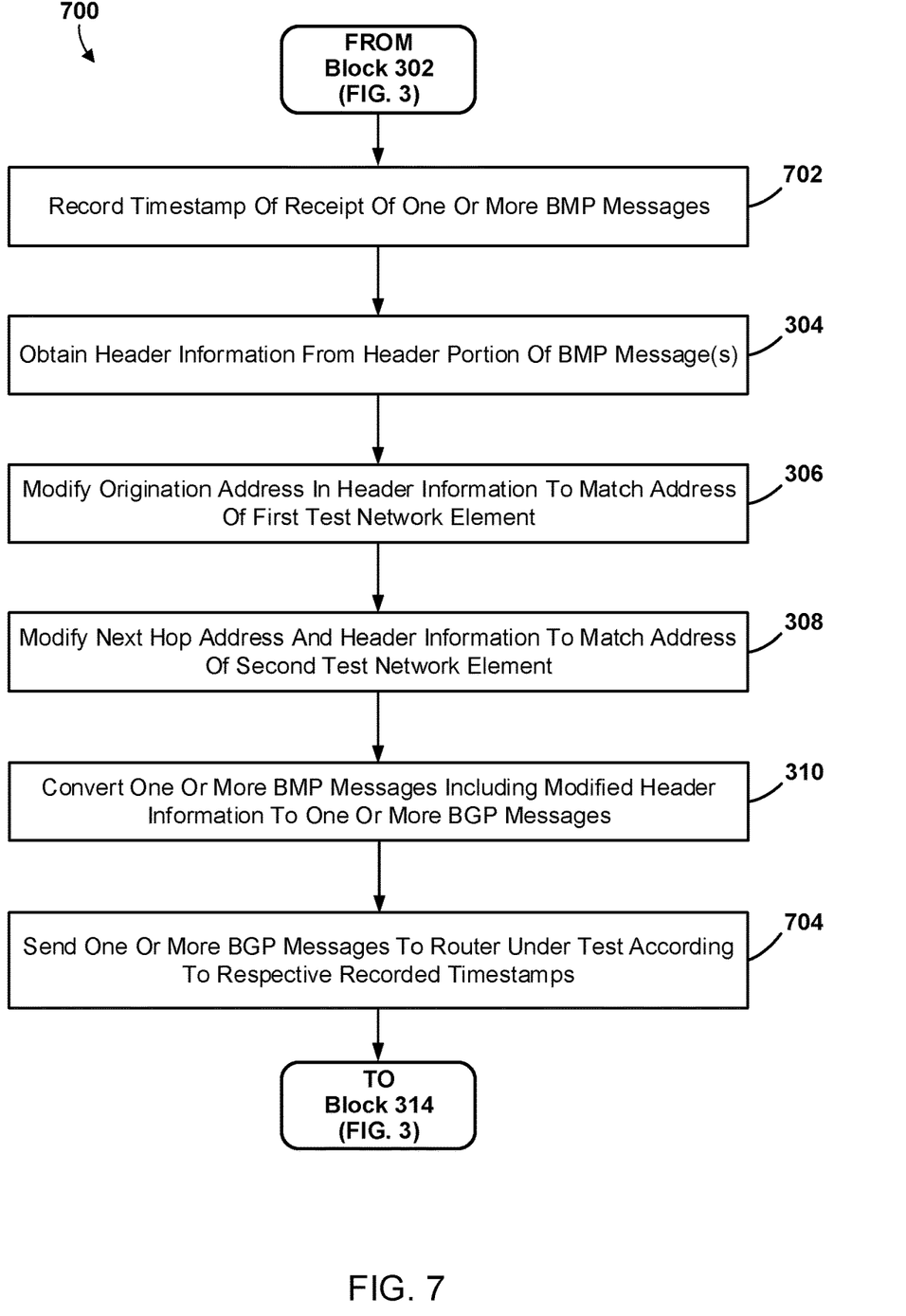
FIG. 7 is a process flow diagram illustrating operations that may be performed as part of a method of testing a router device according to various embodiments.

FIG. 7 is a process flow diagram illustrating operations 700 that may be performed as part of a method of updating a resource address according to various embodiments. With reference to FIGS. 1-7, the operations of the method 700 may be may be implemented in hardware components and/or software components of a computing device (e.g., the network element 200) the operation of which may be controlled by one or more processors (e.g., the processor 201 or the like). In blocks 304-310, the processor may perform operations of like-numbered blocks of the method 300 as described.

Following the operations of block 302 (FIG. 3), the processor may record a timestamp of receipt of the one or more BMP messages in block 702.

In block 704, the processor may send the one or more BGP messages including the modified origination address and the modified next hop address to the router under test according to the respective recorded timestamps. For example, the computing device may send the one or more BGP messages to the router under test based on the relative timing or time intervals of the one or more recorded timestamps to simulate or reflect the flow of BGP messages from the production router.

The processor may proceed to perform the operations of block 314 (FIG. 3).

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations, or operations of the methods 300, 500, 600, and 700 may be substituted for or combined with one or more operations of the operation/methods 300, 500, 600, and 700, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a computing device for testing a router device, comprising:
   receiving one or more Border Monitoring Protocol (BMP) messages collected from a production router;
   obtaining header information from a header portion of the one or more BMP messages;
   modifying an origination address in the header information to match an address of a first test network element;
   modifying a next hop address in the header information to match an address of a second test network element;
   converting the one or more BMP messages including the modified header information to one or more Border Gateway Protocol (BGP) messages; and
   sending the one or more BGP messages to a router under test in the test network.

2. The method of claim 1, further comprising:
   recording a response from the router under test based on the sent one or more BGP messages.

3. The method of claim 1, wherein the received one or more BMP messages are unprocessed by the production router.

4. The method of claim 1, further comprising modifying autonomous system (AS) path information in the header information to match an AS path in the test network.

5. The method of claim 1, further comprising generating a data structure comprising the one or more received BMP messages, the obtained header information, the modified origination address, and the modified next hop address,
   wherein sending the one or more BGP messages to a router under test in the test network comprises sending the data structure to the router under test.

6. The method of claim 1, further comprising recording a timestamp of receipt of the one or more BMP messages,
   wherein sending the one or more BGP messages to a router under test in the test network comprises sending the one or more BGP messages to the router under test according to the respective recorded timestamps.

7. The method of claim 6, wherein sending the one or more BGP messages to the router under test according to the respective recorded timestamps comprises sending the one or more BGP messages using a relative timing of the recorded timestamps.

8. The method of claim 1, further comprising:
   storing the one or more BMP messages collected from the production router in a recorder element;
   wherein obtaining header information from a header portion of the one or more BMP messages comprises:
   retrieving the stored one or more BMP message from the recorder element.

9. A computing device, comprising:
   a communication interface; and
   a processor coupled to the communication interface and configured with processor-executable instructions to perform operations comprising:
      receiving one or more Border Monitoring Protocol (BMP) messages collected from a production router;
      obtaining header information from a header portion of the one or more BMP messages;
      modifying an origination address in the header information to match an address of a first test network element;
      modifying a next hop address in the header information to match an address of a second test network element;

converting the one or more BMP messages including the modified header information to one or more Border Gateway Protocol (BGP) messages; and sending the one or more BGP messages to a router under test in the test network.

10. The computing device of claim 9, wherein the processor is configured with processor-executable instructions to perform operations further comprising:

recording a response from the router under test based on the sent one or more BGP messages.

11. The computing device of claim 9, wherein the processor is configured with processor-executable instructions to perform operations such that the received one or more BMP messages are unprocessed by the production router.

12. The computing device of claim 9, wherein the processor is configured with processor-executable instructions to perform operations further comprising modifying autonomous system (AS) path information in the header information to match an AS path in the test network.

13. The computing device of claim 9, wherein the processor is configured with processor-executable instructions to perform operations further comprising generating a data structure comprising the one or more received BMP messages, the obtained header information, the modified origination address, and the modified next hop address, wherein sending the one or more BGP messages to a router under test in the test network comprises sending the data structure to the router under test.

14. The computing device of claim 9, wherein the processor is configured with processor-executable instructions to perform operations further comprising recording a timestamp of receipt of the one or more BMP messages, wherein sending the one or more BGP messages to a router under test in the test network comprises sending the one or more BGP messages to the router under test according to the respective recorded timestamps.

15. The computing device of claim 14, wherein the processor is configured with processor-executable instructions to perform operations such that sending the one or more BGP messages to the router under test according to the respective recorded timestamps comprises sending the one or more BGP messages using a relative timing of the recorded timestamps.

16. The computing device of claim 9, wherein the processor is configured with processor-executable instructions to perform operations further comprising:

storing the one or more BMP messages collected from the production router in a recorder element;

wherein obtaining header information from a header portion of the one or more BMP messages comprises:

retrieving the stored one or more BMP message from the recorder element.

17. A non-transitory processor-readable storage medium having stored thereon processor-executable software instructions configured to cause a processor of a computing device to perform operations comprising:

receiving one or more Border Monitoring Protocol (BMP) messages collected from a production router;

obtaining header information from a header portion of the one or more BMP messages;

modifying an origination address in the header information to match an address of a first test network element;

modifying a next hop address in the header information to match an address of a second test network element;

converting the one or more BMP messages including the modified header information to one or more Border Gateway Protocol (BGP) messages; and sending the one or more BGP messages to a router under test in the test network.

18. The non-transitory processor-readable storage medium of claim 17, wherein the stored processor-executable software instructions are configured to cause the processor of the computing device to perform operations further comprising:

recording a response from the router under test based on the sent one or more BGP messages.

19. The non-transitory processor-readable storage medium of claim 17, wherein the stored processor-executable software instructions are configured to cause the processor of the computing device to perform operations such that the received one or more BMP messages are unprocessed by the production router.

20. The non-transitory processor-readable storage medium of claim 17, wherein the stored processor-executable software instructions are configured to cause the processor of the computing device to perform operations further comprising modifying autonomous system (AS) path information in the header information to match an AS path in the test network.

21. The non-transitory processor-readable storage medium of claim 17, wherein the stored processor-executable software instructions are configured to cause the processor of the computing device to perform operations further comprising generating a data structure comprising the one or more received BMP messages, the obtained header information, the modified origination address, and the modified next hop address, wherein sending the one or more BGP messages to a router under test in the test network comprises sending the data structure to the router under test.

22. The non-transitory processor-readable storage medium of claim 17, wherein the stored processor-executable software instructions are configured to cause the processor of the computing device to perform operations further comprising recording a timestamp of receipt of the one or more BMP messages, wherein sending the one or more BGP messages to a router under test in the test network comprises sending the one or more BGP messages to the router under test according to the respective recorded timestamps.

23. The non-transitory processor-readable storage medium of claim 22, wherein the stored processor-executable software instructions are configured to cause the processor of the computing device to perform operations such that sending the one or more BGP messages to the router under test according to the respective recorded timestamps comprises sending the one or more BGP messages using a relative timing of the recorded timestamps.

24. The non-transitory processor-readable storage medium of claim 17, wherein the stored processor-executable software instructions are configured to cause the processor of the computing device to perform operations further comprising:

storing the one or more BMP messages collected from the production router in a recorder element;

wherein obtaining header information from a header portion of the one or more BMP messages comprises:

retrieving the stored one or more BMP message from the recorder element.

* * * * *